Oct. 24, 1967  J. R. ROSENTHAL  3,349,397
FLEXIBLE RADIATION ATTENUATOR
Filed Feb. 3, 1966
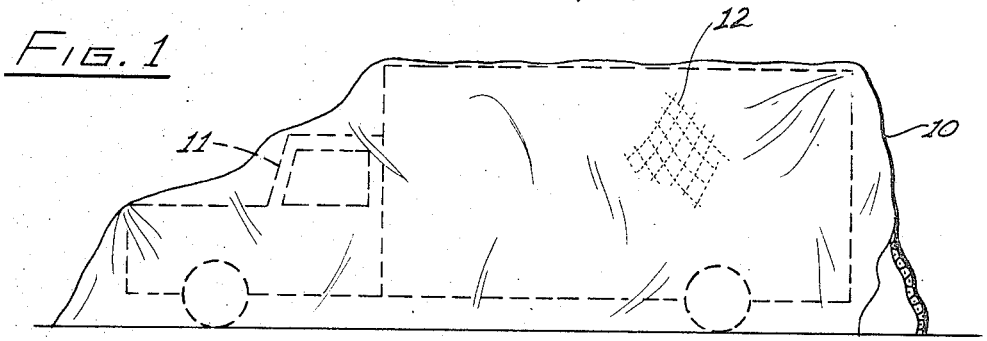
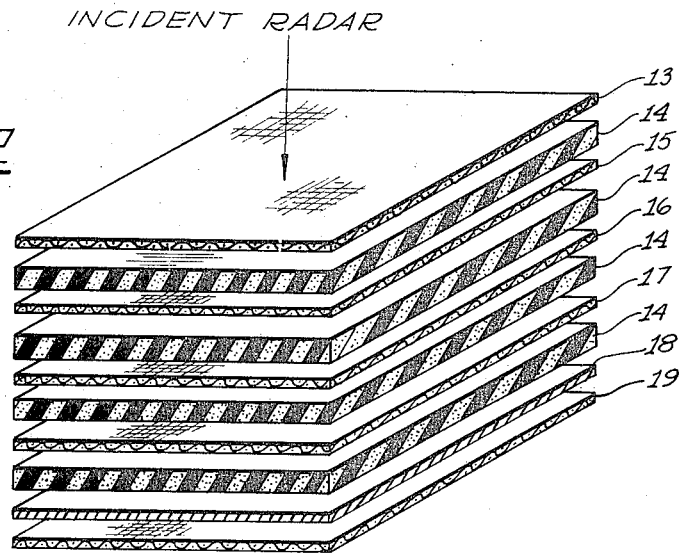
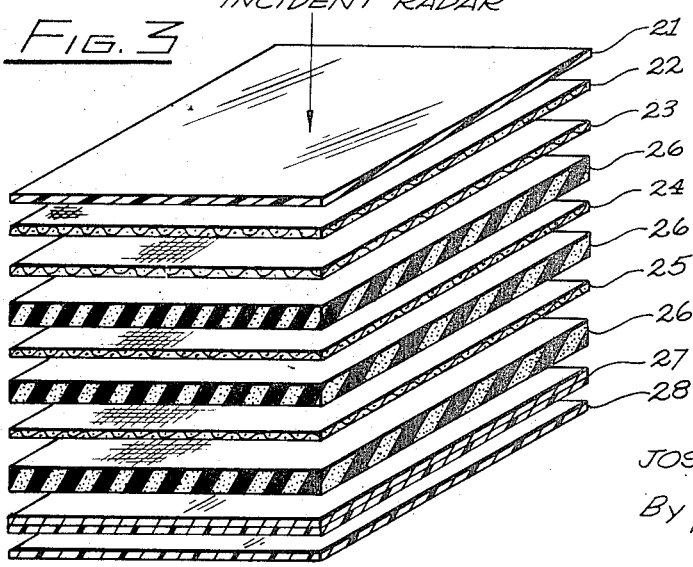
INVENTOR.
JOSEPH R. ROSENTHAL
By Richard D. Seibel
ATTORNEY 3,349,397
FLEXIBLE RADIATION ATTENUATOR
Joseph R. Rosenthal, Tulsa, Okla., assignor to
North American Aviation, Inc.
Filed Feb. 3, 1966, Ser. No. 525,274
6 Claims. (Cl. 343—18)

This invention relates to a flexible radiation attenuator and more particularly relates to a flexible material for attenuating radiation in the frequency range of radar.

In order to camouflage ground equipment from searching radar it is desirable to make the equipment have a radar reflectivity approximating that of the surrounding terrain. In this way any equipment is virtually indistinguishable from the so-called ground clutter. It is usually found, however, that military equipment has a large amount of metal in the construction and this gives a high radar reflectivity so that the equipment is readily detected by radar. Rigid radar attenuating materials have been devised that can be applied to equipment or used in the construction of equipment to minimize radar reflectivity. These, however, are relatively expensive for use with most equipment and are impractical in many situations. In addition, the regular outlines of the equipment remain for detection visually or by careful analysis of radar returns. It is therefore desirable to have a flexible radar attenuating material that can be used to cover stationary or mobile objects in a non-uniform manner to provide radar camouflage.

It is therefore a broad object of this invention to provide an improved radar camouflage.

Thus in the practice of this invention according to a preferred embodiment there is provided a blanket of radar attenuating material that is flexible and can be used to cover equipment or folded or rolled into a lightweight package when not in use. An interference type of radar attenuator is employed wherein electrically thin layers or sheets of resistive material are spaced apart in the same order of magnitude as one-fourth of the wavelength of radiation in the frequency range of radar. In a preferred embodiment the resistive layers comprise fabric sheets coated with an elastomer having carbon particles dispersed therein. Spacing between individual resistive layers is provided by a sheet of plastic foam. A typical blanket has a resistive absorber sheet on the side upon which radar is expected to impinge. Loosely underlying this is a spacer sheet of foam followed by another resistive absorber sheet and additional foam spacer sheets and absorber sheets in consecutive alternation as may be required to obtain a desired attenuation of radar in a particular frequency range. On the far side of the assemblage of absorber sheets and spacer sheets is an electrically conductive layer such as metal foil or metal coated plastic. The individual sheets of material in the blanket loosely overlie each other so that some relative motion can occur and the assembly remains flexible. The sheets are lightly quilted to maintain them a fixed distance apart and to provide a blanket that is readily handled in the field. Good reduction of radar echo over a broad frequency range is obtained by employing such a blanket over metal structures so that the radar echo approximates the appearance of ground clutter. Other aspects of flexible attenuators not claimed herein are described and claimed in copending patent application Ser. No. 525,273 filed herewith entitled "Improved Flexible Radiation Attenuator" by Robert G. Reed and assigned to North American Aviation, Inc., the assignee of this application.

It is therefore a broad object of this invention to provide radar camouflage.

It is another object of this invention to minimize radar reflection.

It is a further object of this invention to provide a flexible radar attenuating blanket.

Other objects and many of the attendant advantages of this invention will be readily appreciated as the same becomes better understood by reference to the following detailed description when considered in connection with the accompanying drawings wherein:

FIG. 1 illustrates a blanket constructed according to the principles of this invention;

FIG. 2 illustrates an exploding section of the blanket of FIG. 1; and

FIG. 3 illustrates an exploded section of another typical blanket.

Throughout the drawings like numerals refer to like parts.

As radar or other electromagnetic wave energy impinges on a structure, the amount of energy reflected from the surface is dependent on the degree of mismatch between the impedance of the structure and the characteristic impedance of air or free space. For these purposes free space can be considered as a wave guide of infinite dimensions which has a characteristic impedance of 377 ohms. Thus it is found that a material having a very low impedance, such as metal, has a large mismatch; its impedance being considerably below the impedance of free space. A large radar reflection is obtained from such material in the same way a standing wave is reflected in a metal terminated wave guide. Likewise a material having an impedance very nearly that of free space reflects an extremely small amount of radar energy.

Vehicles and most military equipment are either constructed of metal or have internal components of metal that will reflect a substanial quantity of radar energy. Because of this it is impossible to make equipment completely transparent to radar and, as an alternative, attenuation of the radar energy that would normally be reflected by the equipment is preferred. In order to reduce reflections from a surface, a match between the impedance of the surface and free space is desirable. In the attenuating blanket described in the illustrative embodiment the effective impedance of the blanket to an incident radar beam is very similar to the impedance of free space. The blanket comprises a plurality of resistive sheets spaced apart from a metal reflector. The impedance as seen by the radar beam is the result of the impedances of all of the resistive structure outside the metal just as in a transmission line where the impedance is determined by all elements. The impedance at the surface or at any point within the structure is obtained by consideration of the impedance of all of the components inwardly of that point.

In a preferred embodiment of an attenuating structure multiple layers of partly conductive material are employed to provide a gradual change in the impedance or its reciprocal, the admittance, between that of free space and that of a metallic internal layer. By providing a gradual transition of increasing admittance, only a low amount of reflection is obtained at any of the individual layers since each is only slightly different from the admittance of the overlying material. The admittance of each of the conductive layers is therefore chosen so as to provide a smooth transition in admittance.

As previously mentioned, a radar beam impinging on a metal surface is reflected therefrom in the same way that reflection to form a standing wave occurs in a metal terminated wave guide. If a sheet of material having a resistivity of 377 ohms per square is placed at one-quarter wavelength spacing from the metal termination, the standing wave set up has a maximum electric field at the resistive material and the energy is in the wave is attenuated by conduction in the resistive material. Such an arrangement is termed a Salisbury screen or quarter wave screen.

A resistivity of 377 ohms per square is employed to match the impedance of free space so that no reflection is obtained from the resistive material. As viewed along the wave guide, this type of termination appears like an infinitely long wave guide as no standing wave is reflected. This occurs for a specific wavelength and reflections occur at other wavelengths with magnitudes determined by their relation to the wavelength for which the screen is tuned. The wavelength of importance is the wavelength in the material between the resistive material and the metal termination and this is dependent on the dielectric constant of the material therebetween.

In order to provide a good attenuating structure capable of attenuating a variety of radar beams, it is desirable to have high attenuation throughout the range of from $2 \times 10^9$ to $20 \times 10^9$ cycles per second or 2 to 20 gHz. This corresponds to a wavelength range of from about 15 to about 1.5 centimeters. In order to obtain a broad band of attenuation it would appear desirable to have a multiplicity of quarter wave screens, however, there is an interaction between screens when more than one is employed and it is also necessary to limit the number due to weight considerations. A limited number of absorber sheets or screens must be used in any practical structure and attenuation is optimized by varying the electrical properties of the individual sheets. In a broad band structure for attenuating waves in the frequency range of from 2 to 20 gHz., a total thickness of composite of about one-half inch is employed to give approximately quarter wave attenuation for the longer waves. The space between individual sheets or screens is in turn selected to provide approximately quarter wave attenuation for the shorter waves. Thus it is desirable to construct a composite blanket having a series of resistive layers spaced apart by a dielectric material and also spaced apart from a conductive sheet. It is preferred to form the conductive sheet as a portion of the blanket so that reflection occurs at a known position relative to the absorber sheets. In the absence of the conductive sheet, radar would reflect from the covered equipment and very little attenuation would be obtained.

In order to obtain an attenuation of radar energy in a one-quarter wave screen arrangement or the like, it is preferred that a layer of resistive or partly conductive material be employed. Likewise to match impedance with the impedance of free space it is preferred that the first absorber sheet upon which radar may impinge have an impedance not greatly dissimilar from that of free space. The electrical properties of this absorber sheet and others to be described hereinafter are controlled to obtain optimum performance of the composite blanket.

A convenient measure of the electrical properties of sheet material at radar frequencies is the insertion loss. Insertion loss is a measure of the decrease of radiation transmitted over a given path when a material is inserted in the path and is expressed as the logarithm of the ratio of radiation intensity with and without the material inserted in the path. It is measured by noting the magnitude of signal transmitted between a transmitter and receiver aligned so as to be on a single radar beam when only air lies therebetween. The material of interest is then inserted in the beam between the transmitter and the receiver and the received signal strength again noted. Insertion loss in decibels is related to impedance by the formula $$\text{Insertion Loss} = -20 \log|2/(2+Y)|$$

where $Y$ is the admittance of the material relative to the admittance of free space.

Good impedance matching between an electrically conductive termination and the impedance of free space requires a range of insertion losses in attenuator sheets. Thus, for example, it may be desirable to employ sheets having an insertion loss of less than 1 decibel or an insertion loss of 15 decibel or sheets having predetermined insertion loss values therebetween.

A typical absorber sheet comprises a glass fabric that has an elastomer coated thereon such as neoprene or the like, or other flexible synthetic resin. Suspended in the elastomer in the coating are particles of carbon or similar semi-conductive materials in order to obtain a selected impedance in the absorber sheet. The impedance of the absorber sheet can also be modified by the addition of metal powders such as aluminum.

In order to control the resistivity and insertion loss of the sheets, the proportion of carbon in the coating, the thickness of the coating and the type of carbon in the coating are controlled. The total weight of coating material on the fabric is preferably in excess of 1 gram per square foot of fabric since lower weights give difficulty in obtaining appreciable electrical conductivity. It is also preferable that the coating thickness be less than 40 grams per square foot as greater thicknesses lead to sheets that are unduly stiff and lack the drapability needed to form complex curvatures.

Table I gives some examples of conductive sheets useful in the practice of this invention with insertion loss measured at a frequency of 9.375 gHz. Many other variations of such sheets are readily prepared. All of these sheets are prepared on a commercially designated 116 type glass cloth which is a 59 x 57 thread count fabric having a crowfoot satin or plain weave. The fabric is about 0.004 inch thick before coating and in a greige or unfinished condition. The conductive compositions were applied by spraying, box brushing, or dip coating of the neoprene-carbon mixture in sufficient solvent of 80 parts toluene, 20 parts xylene to obtain a suitable viscosity, followed by solvent evaporation and heat curing.

TABLE I

| Insertion Loss (db) | Parts Neoprene Resin | Parts Carbon | | | Coating Weight (gm./ft.²) |
|---|---|---|---|---|---|
| | | Graphite | Acetylene Black | Furnace Black | |
| 0.6 | 100 | 51.2 | | | 8.3 |
| 1.6 | 100 | 51.2 | | | 15.0 |
| 1.9 | 100 | 51.2 | | | 17.1 |
| 2.3 | 100 | 60.5 | | | 15.4 |
| 2.9 | 100 | | | 20.5 | 7.6 |
| 3.1 | 100 | | | 20.5 | 8.1 |
| 3.3 | 100 | 60.5 | | | 27.3 |
| 4.0 | 100 | | 51.2 | | 3.7 |
| 5.4 | 100 | 80.0 | | | 17.4 |
| 7.1 | 100 | | 34.1 | | 10.3 |
| 7.3 | 100 | | 80.0 | | 6.4 |
| 7.4 | 100 | | | 23.5 | 16.5 |
| 8.0 | 100 | | 60.5 | | 10.6 |
| 8.9 | 100 | 80.0 | | | 29.2 |

FIG. 1 illustrates a blanket of radar attenuating material incorporating the principles of this invention. As illustrated in this figure there is provided a blanket 10 of flexible material that is readily employed as a removable cover for a piece of equipment such as a truck 11. The blanket is assembled and secured together by conventional quilting 12 so that the drapability of the blanket is not impaired. It will be apparent that such a blanket can be laid over a structure like a building or can be used over selected portions of a vehicle to cover radar "hot-spots." The cover can be made in such a way that the vehicle can be moved with the cover in place and such covers can be used on boats or for temporarily covering aircraft. Covers can be made in large panels or rolls or can be tailored to fit an underlying structure.

FIG. 2 illustrates an exploded cross section of the blanket illustrated in FIG. 1. In the illustration of FIG. 2 the threat radar is considered to come from the upper portion of the figure and impinge on the upper portion of the assemblage as illustrated. The first material encountered by incident radar is an absorber sheet 13 comprising a fabric coated with an elastomer having carbon dispersed therein as has been described. In a preferred embodiment the absorber sheet 13 has an insertion loss of 0.3 to 0.6 db. Thus the first absorber sheet 13 has an impedance very similar to that of free space.

Loosely underlying the absorber sheet 13 is a foam spacer sheet 14. The foam material has a thickness of about 0.2 inch and is preferably a sheet of flexible polyurethane foam such as are readily available commercially. It will also be apparent that other types of flexible foam materials such as polyethers and polyester type foams can readily be employed in the practice of this invention. For many applications polyester foams are preferred because of their greater resistance to chemical attack and a lower cost.

Loosely underlying the flexible foam spacer layer is a second absorber sheet 15. The second absorber sheet 15 in a preferred embodiment has an insertion loss of about 2.9 db. Loosely underlying the second absorber sheet 15 is a foam spacer layer 14 substantially identical to the aforementioned foam spacer sheet above the second absorber sheet 15. Loosely underlying the foam spacer is a third absorber sheet 16 having an insertion loss of about 3.1 db. Loosely underlying the third absorber sheet 16 is a flexible foam spacer sheet 14, and loosely underlying the foam spacer layer 14 is a fourth absorber sheet 17 having an insertion loss of 7.4 db. Loosely underlying the absorber sheet 17 is a flexible foam spacer layer 14, and loosely underlying the flexible foam spacer layer 14 is a sheet of metal foil 18 such as aluminum foil that forms a conductive sheet. A final loosely underlying layer in the assemblage comprises a conventional fabric 19 that provides some resistance to rough handling so that the blanket can be employed in field applications. Thus the absorber sheets in the assemblage are in consecutive alternation with the spacer sheets, that is between each pair of spacer sheets is an absorber sheet and between each pair of absorber sheets is a spacer sheet.

In constructing a blanket as illustrated in FIGS. 1 and 2 it is preferred to stack loose sheets of material of the type described and quilt the blanket in about nine inch squares so that the sheets are held together in a substantially fixed spacing and yet the sheets can have some small relative lateral movement therebetween so that the light quilting does not noticeably reduce the flexibility of the assemblage. In field use, individual sheets can be stacked as described and held in relative position by weights or the like so that an object can be covered with a blanket having absorption in a frequency range of the local threat radar. A blanket such as described has a total thickness of approximately one inch and has a weight of a little over one-half pound per square foot. A blanket constructed as described in relation to FIGS. 1 and 2 was tested in an antenna range with the blanket covering a flat aluminum plate normal to a radar beam. It was found that the blanket was an excellent attenuator of radiation in the frequency range from about 2 gHz. to about 10 gHz. with reductions of radar echo by more than 20 db in the frequency range above 3 gHz. as compared with the metal plate alone.

FIG. 3 illustrates an exploded cross section of another typical radiation attenuating blanket constructed according to the principles of this invention. As illustrated in this figure incident radar initially impinges from the top of the figure on a sheet of plastic such as, for example, polyvinyl chloride about 0.004 inch thick. The polyvinyl chloride sheet provides a water proof envelope as more particularly described and claimed in the aforementioned copending application. Loosely underlying the plastic sheet 21 is a sheet of conventional camouflage net 22 which comprises a loosely woven fabric having a mottled pattern of colors thereon to provide visual camouflage. Loosely underlying the camouflage net 22 are a plurality of absorber sheet 23, 24 and 25 in consecutive alternation with flexible foam spacer sheets 26. The spacer sheets each comprise a polyester foam in a thickness of about 0.090 inch. The absorber sheet 23 in a preferred embodiment has an insertion loss of about 1.9 db. The second absorber sheet 24 has an insertion loss of about 2.9 db and the third absorber sheet 25 has an insertion loss of about 7.4 db.

Loosely underlying the final spacer sheet 26 is a conductive sheet 27. A typical conductive sheet comprises a plastic having a layer of metal deposited thereon. Thus, for example, the conductive sheet 27 comprises a sheet of polyethylene terephthalate that is aluminized. It will also be appreciated that metalized polyethylene, polyester or polyether films can also be employed as a conductive sheet.

Loosely underlying the conductive sheet 27 is a sheet of plastic 28 that is preferably substantially identical to the plastic sheet 21 upon which the radar is incident. Thus in a preferred embodiment the final sheet is 0.004 inch thick polyvinyl chloride. The sheets of plastic 21 and 28 are heat sealed or adhesively bonded around the edges to provide a closed envelope that gives protection to the sheets contained therein.

In construction a blanket as illustrated in FIG. 3 it is preferred to stack loose sheets of material as described and maintain the sheets in face to face juxtaposition by lightly quilting or cementing the assemblage to minimize the possibility of shifting of the loose sheets. The sheets are then enclosed in an envelope of plastic formed by heat sealing or adhesively bonding the plastic sheets 21 and 28. These sheets are sealed around most of the edge of the assemblage and a small opening is left so that excess air can be removed to an internal pressure no more than the pressure corresponding to the maximum altitude at which the blanket is to be employed. Vacuum in the envelope is undesirable since there is a tendency to crush the foam spacer layer and an evacuated envelope makes the blanket appreciably stiffer. Removing air from the envelope also assures that the sheets are gently compressed together by atmospheric pressure so that the individual absorber sheets are a selected distance apart corresponding to the thickness of the spacer sheets.

A flexible attenuator as described and illustrated in FIG. 3 is about 0.40 inch thick and has a weight of about 0.27 pound per square foot. A blanket of the type described and illustrated was employed for covering an aluminum plate for testing in an antenna range. A blanket of this type shows excellent attenuation of radiation and a minimum radar echo in the frequency range from about 8 to 35 gHz. Throughout much of this frequency range a reduction in radar echo of well over 20 db is obtained as compared to the echo from a metal plate alone.

Many modifications of the radar attenuating blanket described and illustrated can be provided. These flexible blankets can have any of a variety of thicknesses and frequency ranges of attenuation. Thus different thicknesses of the spacer layer can be employed as well as differing insertion losses in the absorber sheets. Also differing numbers of absorber sheets and spacer sheets can be employed to provide a particular thickness or frequency range. In addition to blankets, tailored covers can be made for specific articles of equipment such as vehicles, equipment and the like.

Obviously many modifications and variations of the present invention are possible in light of the above teachings. It is therefore to be understood that within the scope of the appended claims the invention may be practiced otherwise than as specifically described.

What is claimed is:
1. A flexible radar attenuator comprising:
  a flexible conductive sheet;
  a plurality of flexible absorber sheets coextensive with said conductive sheet, each of said absorber sheets comprising a fabric having semiconductive particles secured thereto;
  a plurality of flexible spacer sheets coextensive with said conductive sheet, each of said spacer sheets comprising a flexible foam having a thickness in the same order of magnitude as one-fourth of the wavelength of radiation in the frequency range of radar, said spacer sheets and absorber sheets loosely overlying each other in consecutive alternation; and means for maintaining all of said sheets in relatively loose face-to-face juxtaposition for permitting minor relative lateral movement of said sheets without impairing the flexibility thereof.

2. A flexible radar attenuator as defined in claim 1 wherein each of said flexible absorber sheets comprises a fabric having finely divided carbon particles secured thereto by a flexible synthetic resin; and said means for maintaining said sheets in loose juxtaposition comprises intermittent quilting of the assembled sheets to permit minor relative lateral movement of said sheets without impairing the flexibility thereof.

3. A flexible radar attenuator as defined in claim 1 wherein each of said spacer sheets is bonded to one of said absorber sheets to form a subassembly and wherein each of said subassemblies loosely overlies an adjacent subassembly.

4. A flexible radar attenuator as defined in claim 1 wherein each of said spacer sheets comprises a flexible foam having a thickness of about 0.09 inch; and wherein said plurality of absorber sheets comprises:
- a first absorber sheet separated from said conductive sheet by one of said spacer sheets, said first absorber sheet having an insertion loss of about 7.4 db;
- a second absorber sheet separated from said first absorber sheet by one of said spacer sheets, said second absorber sheet having an insertion loss of about 2.9 db; and
- a third absorber sheet separated from said second absorber sheet by one of said spacer sheets, said third absorber sheet having an insertion loss of about 1.9 db.

5. A flexible radar attenuator as defined in claim 1 wherein each of said spacer sheets comprises a flexible foam having a thickness of about 0.20 inch; and wherein said plurality of absorber sheets comprises:
- a first absorber sheet separated from said conductive sheet by one of said spacer sheets, said first absorber sheet having an insertion loss of about 7.4 db;
- a second absorber sheet separated from said first absorber sheet by one of said spacer sheets, said second absorber sheet having an insertion loss of about 3.1 db;
- a third absorber sheet separated from said second absorber sheet by one of said spacer sheets, said third absorber sheet having an insertion loss of about 2.9 db; and
- a fourth absorber sheet separated from said third absorber sheet by one of said spacer sheets, said fourth absorber sheet having an insertion loss of from about 0.3 to 0.6 db.

6. A flexible radar attenuator as defined in claim 5 wherein said means for maintaining said sheets in loose juxtaposition comprises intermittent quilting of the assembled sheets to permit minor relative lateral movement of said sheets without impairing the flexibility thereof; and wherein each of said spacer sheets is bonded to one of said absorber sheets to form a subassembly and wherein each of said subassemblies loosely overlies an adjacent subassembly.

References Cited
UNITED STATES PATENTS

| | | | |
|---|---|---|---|
| 2,599,944 | 6/1952 | Salisbury | 343—18 X |
| 2,875,435 | 2/1959 | McMillan | 343—18 |

FOREIGN PATENTS

| | | |
|---|---|---|
| 911,748 | 6/1954 | Germany. |

RODNEY D. BENNETT, *Primary Examiner.*

CHESTER L. JUSTUS, *Examiner.*

D. C. KAUFMAN, *Assistant Examiner.*